Jan. 13, 1925.
G. N. ALLEN
1,522,706
FRONT RUNNING GEAR FOR VEHICLES
Filed March 1, 1922
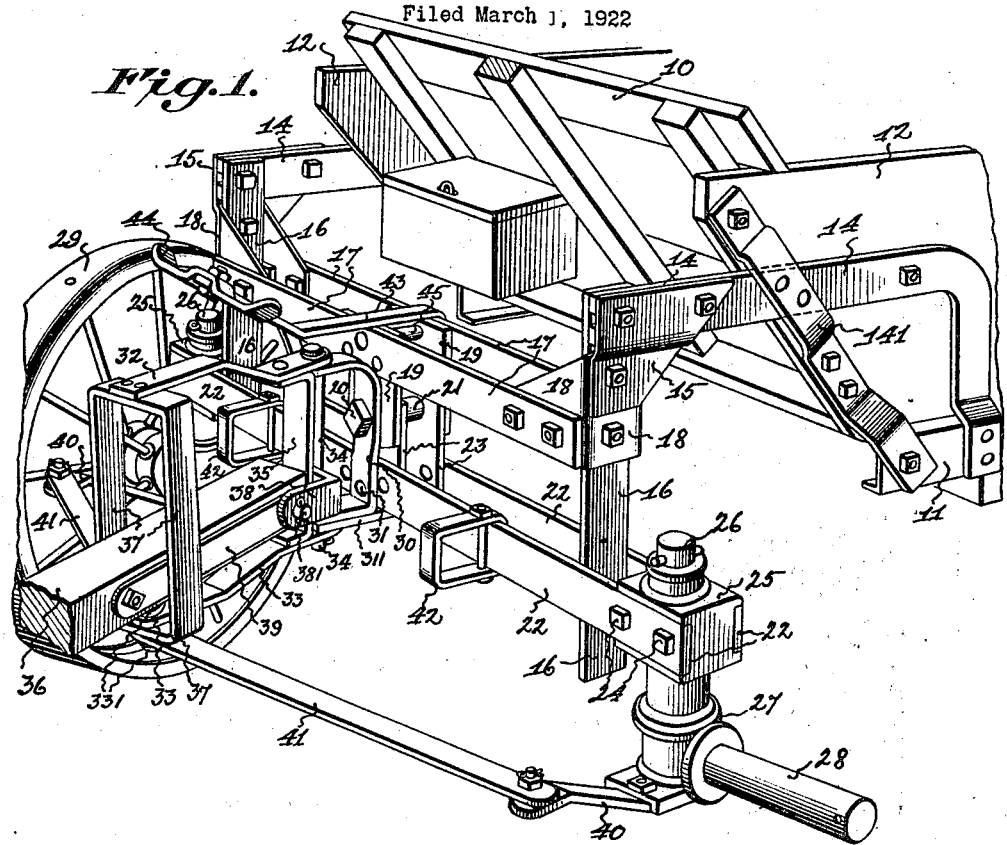
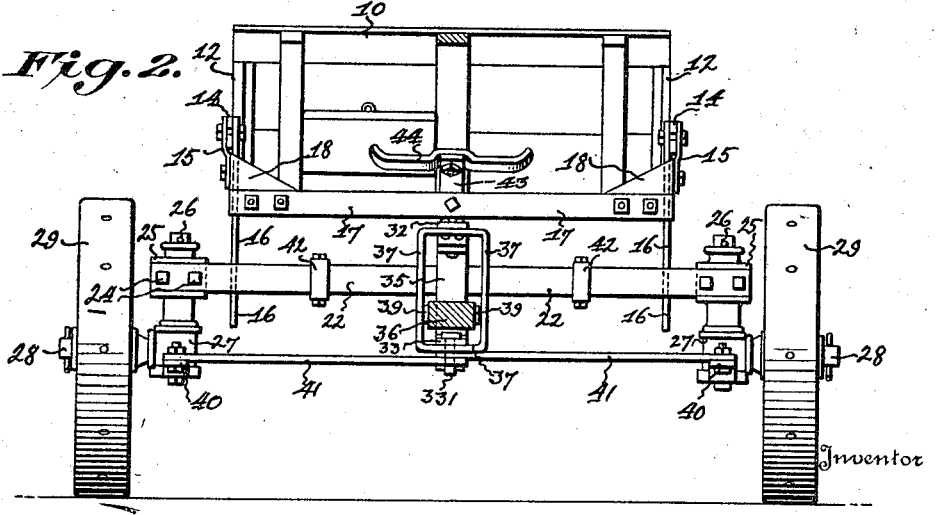
Witness:— Chas. L. Griesbauer
Inventor
George Norwood Allen,
By W. Schomborn,
Attorney Patented Jan. 13, 1925.

1,522,706

UNITED STATES PATENT OFFICE.

GEORGE NORWOOD ALLEN, OF HOOSICK FALLS, NEW YORK.

FRONT RUNNING GEAR FOR VEHICLES.

Application filed March 1, 1922. Serial No. 540,079.

*To all whom it may concern:*

Be it known that I, GEORGE NORWOOD ALLEN, a citizen of the United States, residing at Hoosick Falls, in the county of Rensselaer and State of New York, have invented certain new and useful Improvements in Front Running Gears for Vehicles, of which the following is a specification.

This invention relates to front running or foretruck for vehicles, and is more particularly adapted for use in connection with manure spreaders.

The objects of the invention are:—

First, to construct a front running gear or foretruck, which will not only be light and rigid but also easily assembled or installed or disassembled and of a minimum cost of manufacture.

Second, to construct and arrange the parts of the front running gear which will prevent the whipping of the draft pole and permit the use of large diameter front wheels to lighten the draft and give greater clearance for ruts or other obstructions due to rough and irregular field conditions.

Third, to arrange and combine a support for the box or body to the front axle whereby the front wheels will be able to turn under said support through nearly an angle of ninety degrees from their position when the vehicle is moving straight forward, so that the body or box of the manure spreader may be low down and parallel to the ground without interfering with the free and easy turning movement of said front wheels, and enabling said wheels to turn nearly parallel with the movement of the draft pole, thereby insuring ready and certain manœuvring of the spreader in cramped or crowded operating conditions.

Fourth, to so construct and arrange upper and lower transverse supports with pivotal connections which will allow the front wheels to have a free rocking or oscillating movement while passing over rough ground without subjecting any of the elements comprising the front running gear or body of the spreader to any undue strains or stresses, thereby eliminating any binding action between said elements and hence avoiding rapid deterioration and secure a long period of usefulness for the spreader with a minimum of attention.

Fifth, to so construct, arrange and connect the rear end of the draft pole with the front running gear, whereby the free end of said pole and front gear and wheels may be easily and properly turned through nearly an arc of one hundred and eighty degrees, and the rear or attached end of said draft pole may readily and freely at all times move in a vertical plane.

Sixth, to construct and arrange a guide for the rear or attached end of the draft pole which not only acts as a pole guide and means for turning the front wheels, but also as a bumper when acting in conjunction with a stop to prevent the front wheels from being turned into a dangerous position and through an arc approaching one hundred and eighty degrees.

Seventh, other objects and advantages of the invention will appear from the detailed description of the construction and operation to be hereinafter given.

The invention consists of structural characteristics and relative arrangement of elements which will be hereinafter more fully described and particularly pointed out in the appended claims.

In the drawings, in which the same reference characters indicate the same parts in the figures:

Figure 1 is a perspective view of the front end of a manure spreader provided with the improved front running gear, and Figure 2 is a front elevation on a reduced scale of the spreader.

Referring to the drawings, 10 represents the outwardly inclined or overhanging front end of the box or body of the manure spreader, which is provided with the usual sills 11 and side-boards 12. Suitably secured on each side of the body and sills 11 and side-boards 12 and extending forward of the front end 10, is an arched support 14 having connected at its end by means of a metal gusset 15 a depending vertical brace 16. Said arched supports 14 may be braced against lateral displacement from the side-boards 12 by reenforcing strips 141 secured to the outer edges of the forwardly inclined front end 10. An upper transverse support having members 17, 17 is secured and connected to the upper sections of the vertical braces 16, 16, by means of U-shaped metal gussets 18, 18, which provide a rigid and strong hanger structure to prevent any displacement or change of the relative position of the arched supports 14, 14 and vertical braces 16, 16, with each other and in proper alinement, and transfers a part of the draft to the supports 14, 14, as will be presently explained.

Preferably secured on the inner side and between and at the middle portion of the two separated members 17, 17 of the upper transverse support by rivets or otherwise, are two separate hinge supports or plates 19, 19, and 20 is a hinge pin passing through said plates with a sleeve or pipe spacer 21 between the plates 19, 19 to hold them in proper position for purposes to be presently described.

22, 22 are separated bars which form a hinged transverse lower support or front axle, and are provided at their middle portion with plates 23. 23 rigidly secured to the inner sides of said bars 22, 22, said plates 23, 23 having at their upper ends a hinged or pivotal connection on the sleeve or pipe spacer 21 and between the hinge supports or plates 19, 19. The separated bars 22, 22 are arranged and disposed so that the depending vertical braces 16, 16 pass between them and the front and rear edges of said braces will have a sliding contact with the inner sides of said bars 22, 22 and act as a guideway for the ends of the transverse lower support or front axle when it oscillates or rocks on the sleeve or pipe spacer 21 with the hinge pin 20 as a center.

At each of the outer ends and rigidly and tightly secured between the bars 22, 22 of the transverse lower support or front axle, by means of bolts 24, 24, is a hanger or bearing 25 which acts as a spacer for the ends of the bars 22, 22 and at the same time receives the upright or vertical pivoted arm 26 of a steering knuckle 27 having a wheel spindle 28 on which is rotatably mounted a front wheel 29.

30 is a draft clevis pivotally connected at its central section to the foremost hinge support or plate 19 by means of the hinge pin 20, and its lower end is secured by means of tie bolt 31 to the foremost bar 22 and plate 23, and a tie strap 311 below said clevis 30 is also secured to the back of the rear bar 22 of the lower support or front axles by said tie bolt 31, whereby the draft exerted on said clevis 30 is properly and uniformly distributed to the members of the upper transverse supports 17, vertical braces 16, 16 and arched supports 14, 14, to the body of the spreader, as will be readily understood.

32 and 33 are, respectively, upper and lower pole guide straps, which are pivotally connected at their rear ends to the forwardly projecting ends of the draft clevis 30 by means of a draft pin 34, as shown, and just forward of and separated from said pin 34 and connected between the rear ends of the pole guide straps 32 and 33, is provided an upright brace 35 which not only acts as a spacer and brace for the rear ends of said straps 32 and 33, but supplies a stiff and rigid section for applying the draft of the pole 36, to be presently described.

A pole guide 37 consisting of a box-like or rectangular frame is attached to the forward end of the upper guide strap 32 and secured by a pin 331 to the strap 23, and is of such a width as to have a sliding fit with the sides of the pole 36. The rear end of said pole 36 is passed through the guide 37 and is provided with a U-shaped clevis 38, preferably pivotally connected by a pin 381 to said end, and is so constructed and arranged as to have its middle section interposed between the adjacent sides of the separated upright draft pin 34 and upright brace 35, whereby the rear end of the pole 36 will not only be able to swing through an arc approaching one hundred and eighty degrees, but, as will be readily understood, have a restricted and controlled movement in a vertical plane freely within the boundaries circumscribed by pin 34, brace 35, guide straps 32 and 33 and pole guide 37, and yet permit the rear end of said pole 36 to either push or pull with respect to the draft pin 34 in any position of its movements in said vertical plane and swing in the above arc.

Said guide straps 32 and 33 are offset so as to be a greater distance apart at their forward ends, so as to permit a wider range of movement of the pole 36 in the guide 37. The sides of the rear section of the draft pole 36 are preferably provided with wear plates 39 to keep the wooden pole from chafing and wearing away and preventing lost motion within the pole guide 37 and clevis 39. 40, 40 are extensions or steering arms slightly offset and connected to the steering knuckles 27, 27, and 41, 41 are links or distance rods having one end pivotally connected to an outer end of the steering arm 40, while their other ends are pivotally connected by the pin 331 to the lower side or end of the pole guide 37, so that when the pole 36 swings to the right or left its motion is imparted through the guide 37 and pin 331 to the links or rods 41, 41, and arms 40, 40 and move the steering knuckles 27, 27, with their front wheels 29, 29, in unison, as is common in this class of steering gear.

42, 42 are stops so positioned and secured to the forward bar 22 of the transverse lower support that when the draft pole 36 is swung around, the pole guide 37 will come in contact with said stops 42, 42, and prevent the front wheels 29, 29 from swinging beyond an arc of ninety degrees and cause a disorganization and damage of the front running gear and body of the spreader.

43 is a support for a foot rest 44 and is secured at the rear of the rear member 17 of the upper transverse support by a bolt 45, and rests on the upper edges of both members 17, 17, thereby providing a stiff, substantial, light, cheap and easily installed foot rest for the driver.

From the foregoing disclosure of the construction and arrangement of parts, it will be seen that when the draft pole 36 swings either to the right or left, the pole guide 37 will follow the movement of the pole 36 and cause the front wheels 29 to move in unison, and the end of the pole is capable of conveying at all times a backward thrust or forward pull to the body of the spreader, and during any period of these operations the end of the pole may have a limited movement in a vertical plane so as to properly adjust the pole to correctly apply said thrust or pull to the body of the spreader. Also the lower supports or bars 22, 22 forming the front axle are capable of rocking in a transverse vertical plane at any angle of turning movement while adapting themselves to the contour of the ground over which the spreader is passing, and in any angular or rocked position, said lower support or front axle is capable of co-operating with said braces 16, 16 to pull forward or push backward the body of the spreader.

From the foregoing description of the construction and arrangement of parts and mode of assembling the same, it will be readily seen that a front running gear especially adapted for a manure spreader has been devised which comprises a minimum number of highly efficient cooperating elements of simple construction, which can be cheaply manufactured and readily installed or assembled or disassembled without the use of skilled labor or special tools, and said elements are likewise of such size and shapes as to enable the same to be easily handled, and packed in a compact form for shipment or storage.

It will also be seen that all the objects and advantages recited in the statement of invention have been fully carried out, and while the preferred form has been shown and described, it is to be understood that many changes will suggest themselves, as, for example, omitting the pole guide 37, foot rest 44, stops 42, and hanger or bearings 25, without in any way changing the essential features of construction or departing from the spirit of the invention as expressed in the claims.

What I claim is:—

1. A front running gear for vehicles comprising a body, a support at each side of and attached to and projecting from the front end of said body and having a depending vertical brace a substantial distance from the longitudinal axis of the body, an upper transverse support secured to and connecting the upper sections of said depending vertical braces, a hinge support secured to said upper transverse support between said vertical braces, a transverse lower support pivotally connected or hinged between its ends to said hinge support, and said lower support ends so constructed and arranged to be engaged and guided by said depending vertical braces, a front supporting wheel journaled on each of the ends of the transverse lower support, a draft pole having one end pivotally connected to said transverse lower support, and means operated by the draft pole for turning simultaneously the front supporting wheels.

2. A front running gear for vehicles comprising a body, a support at each side of and attached to and projecting from the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support, and said lower support ends so constructed and arranged to be engaged and guided by said depending vertical braces, a steering knuckle having a spindle and pivotally connected to each of the outer ends of said transverse lower support, a front supporting wheel journaled on each of said spindles, a draft pole having one end pivotally connected to said transverse lower support, and means for pivotally connecting the draft pole with each of said steering knuckles.

3. A front running gear for vehicles comprising a body, a support at each side of and attached to and projecting from the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support and said lower support ends so constructed and arranged to be engaged and guided by said depending vertical braces, a steering knuckle having a spindle and pivotally connected to each of the outer ends of said transverse lower support, a front supporting wheel journaled on each of said spindles, a draft pole guide, straps pivotally connecting said pole guide to the lower support, a draft pole within said pole guide and having one end pivotally connected to said transverse lower support, and means for pivotally connecting the draft pole guide with each of said steering knuckles.

4. A front running gear for vehicles comprising a body, a support at each side of and attached to and projecting from the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support and said lower support ends so constructed and arranged to be engaged and guided by said depending vertical braces, a steering knuckle having a spindle and pivotally connected to each of the outer ends of said transverse lower support, a front supporting wheel journaled on each of said spindles, a draft pole guide hinged to said lower support, a draft pole within said pole guide and having one end pivotally connected to said transverse lower support movable in a vertical plane in said pole guide, and means for pivotally connecting the draft pole guide with each of said steering knuckles.

5. A front running gear for vehicles comprising a body, a support at each side of and attached to the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support and said lower support ends so constructed and arranged to be engaged and guided by said depending vertical braces, stops on said lower support, a steering knuckle having a spindle and pivotally connected to each of the outer ends of said transverse lower support, a front supporting wheel journaled on each of said spindles, a draft pole guide hinged to said lower support and adapted to abut against said stops, a draft pole within said pole guide and having one end pivotally connected to said transverse lower support movable in a vertical plane in said pole guide, and means for pivotally connecting the draft pole guide with each of said steering knuckles.

6. A front running gear for vehicles comprising a body, a support at each side of and attached to the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support and said lower support ends so constructed and arranged to be engaged and guided by said depending vertical braces, a draft clevis connected to said lower support, a steering knuckle having a spindle and pivotally connected to each of the outer ends of said transverse lower support, a front supporting wheel journaled on each of said spindles, a draft pole guide hinged to said draft clevis, a draft pole within said pole guide and having one end pivotally and slidingly connected to said draft clevis, and means for pivotally connecting the draft pole guide with each of said steering knuckles.

7. A front running gear for vehicles comprising a body, a support at each side of and attached to the front end of said body and having a depending vertical brace, an upper transverse support secured to and connecting the upper sections of said depending vertical braces, a hinge support secured to and depending from said upper transverse support between said vertical braces, a transverse lower support pivotally connected or hinged between its ends to said hinge support and said lower support ends so constructed and arranged to be engaged and guided by said depending vertical braces, a draft clevis connected to said lower support, a steering knuckle having a spindle and pivotally connected to each of the outer ends of said transverse lower support, a front supporting wheel journaled on each of said spindles, a draft pole guide, straps pivotally connecting said pole guide to the draft clevis, a draft pole having one end vertically movable within said pole guide and pivotally connected to said draft clevis, and means for pivotally connecting the draft pole guide with each of said steering knuckles.

8. A front running gear for vehicles comprising a body, a support at each side of and attached to the front end of said body and having a depending vertical brace, an upper transverse support secured to and connecting the upper sections of said depending vertical braces, a foot rest secured to and resting on said upper transverse support, a hinge support secured to and depending from said upper transverse support between said vertical braces, a transverse lower support pivotally connected or hinged between its ends to said hinge support and said lower support ends so constructed and arranged to be engaged and guided by said depending vertical braces, a steering knuckle having a spindle and pivotally connected to each of the outer ends of said transverse lower support, a front supporting wheel journaled on each of said spindles, a draft pole having one end pivotally connected to said transverse lower support, and means for pivotally connecting the draft pole with each of said steering knuckles.

9. A front running gear for vehicles comprising a body, a support at each side of and attached to and projecting from the front end of said body and having a depending brace a substantial distance from the longitudinal axis of the body, an upper transverse support secured to and connected to said body, a hinge support secured to and depending from said upper transverse support between said vertical braces, a transverse lower support pivotally connected or hinged between its ends to said hinge support, and said lower support ends so constructed and arranged to be engaged and guided by said depending braces, a front supporting wheel journaled on each of the ends of the transverse lower support, a draft pole having one end pivotally connected to said transverse lower support, and means operated by the draft pole for turning simultaneously the front supporting wheels.

In testimony whereof I hereunto affix my signature.

GEORGE NORWOOD ALLEN.